(12) United States Patent
Abrams

(10) Patent No.: US 7,021,471 B2
(45) Date of Patent: Apr. 4, 2006

(54) DIFFUSER FOR AN OIL WATER SEPARATOR SYSTEM

(75) Inventor: Steven M. Abrams, New Albany, OH (US)

(73) Assignee: Hamilton Welding Company, Columbus, OH (US)

( * ) Notice: Subject to any disclaimer, the term of this patent is extended or adjusted under 35 U.S.C. 154(b) by 0 days.

(21) Appl. No.: 10/341,272

(22) Filed: May 6, 2003

(65) Prior Publication Data

US 2004/0222149 A1   Nov. 11, 2004

(51) Int. Cl.
*B01D 17/025* (2006.01)

(52) U.S. Cl. .................. 210/519; 210/521; 210/538

(58) Field of Classification Search .............. 210/513, 210/519, 521, 532.1, 538, 540
See application file for complete search history.

(56) References Cited

U.S. PATENT DOCUMENTS

| | | | | |
|---|---|---|---|---|
| 357,349 | A | * | 2/1887 | Waring, Jr. .................. 210/538 |
| 745,519 | A | * | 12/1903 | Pravicha et al. ............. 210/521 |
| 1,741,187 | A | * | 12/1929 | Fuqua ......................... 210/519 |
| 3,957,656 | A | * | 5/1976 | Castelli ....................... 210/521 |
| 4,278,545 | A | * | 7/1981 | Batutis et al. ............... 210/521 |
| 4,308,136 | A | * | 12/1981 | Warne, Jr. ................... 210/519 |
| 4,406,789 | A | * | 9/1983 | Brignon ...................... 210/519 |
| 4,722,800 | A | | 2/1988 | Aymong |
| 4,844,819 | A | | 7/1989 | Norman |
| 5,204,000 | A | * | 4/1993 | Steadman et al. .......... 210/519 |
| 5,229,015 | A | | 7/1993 | Keep et al. |
| 5,503,753 | A | * | 4/1996 | Woodall et al. .......... 210/532.1 |
| 5,505,860 | A | | 4/1996 | Sager |
| 5,520,825 | A | | 5/1996 | Rice |
| 5,554,301 | A | * | 9/1996 | Rippetoe et al. ............ 210/519 |
| 5,637,234 | A | * | 6/1997 | McCasland ................. 210/519 |
| 5,746,911 | A | | 5/1998 | Pank |
| 6,077,448 | A | * | 6/2000 | Tran-Quoc-Nam et al. ....................... 210/532.1 |
| 6,190,545 | B1 | | 2/2001 | Williamson |

* cited by examiner

*Primary Examiner*—Christopher Upton
(74) *Attorney, Agent, or Firm*—Kremblas, Foster, Phillips & Pollick

(57) ABSTRACT

An oil-water separator system diffusing chamber having a diffuser and a baffle with uptake control means. The diffuser includes an attachment portion and a lower portion, with the attachment portion being secured to inlet conduit of the separator system, and with the lower portion being connected to the attachment portion and having flow channeling means. The diffuser has a first side and a second side, with the first side of the diffuser having formed therein a plurality of apertures. The baffle has a first side, a second side and a top edge. The uptake control means includes a plurality of pipes and a pipe restraining means, with each of the pipes having a first end, a second end and a sidewall, with at least one of the pipes having a sidewall with apertures formed therein. The pipes first ends are retained by the pipe restraining means adjacent the baffle first side and the pipes second ends are retained adjacent to the top edge. Preferably the diffuser is of a generally inverted Y-shape with the diffuser first side only having apertures formed therein. Preferably the pipes in said uptake control means are corrugated. Preferably, the baffle has formed therein a plurality of apertures, with the second ends of the pipes of the uptake control means extending through the baffle apertures so as to extend downstream of the diffusing chamber in the oil-water separator system.

16 Claims, 3 Drawing Sheets

DIFFUSER FOR AN OIL WATER SEPARATOR SYSTEM

FIELD OF THE INVENTION

The present invention relates generally to an oil water separator system, and more particularly to an oil water separator inlet delivery system, and even more particularly to a diffuser component used in an oil water separator inlet delivery system.

BACKGROUND OF THE INVENTION

This invention is directed to the providing of an oil water separator inlet delivery system, the utilization of which efficaciously enhances the performance of the oil water separator system in which it is used. Relatively recently, the importance of water quality and the impact of runoff on natural streams and watercourses has been recognized. Regulations, especially at the federal level, have been enacted to address this concern. Subsequent to federal action, states and local communities have enacted similarly focused legislation.

One particular area of concern is runoff from new construction, particularly parking lots. Another area of concern is workplaces where oil and grease accumulate on the floor until such a time as the washing of the floor causes them to enter the wastewater system. Regardless of the source of the runoff, there is considerable interest in trying to decrease the amount of sediment, oil, grease, and other contaminants ultimately being discharged into streams, rivers, and other bodies of water. Consequently, oil water separators have been developed for installation as part of a drainage system.

For example, an industrial user who controls or collects storm water and discharges it through a pipe, drain or other outlet, into a sewer system or navigable waterway must comply with the National Pollutant Discharge Elimination System (NPDES). Mandated by Congress under Section 402 of the Clean Water Act, the NPDES storm water program is a two-phased approach to eliminating or reducing accidental and chronic low-level releases of oil-polluted water. A working oil water separator can be an important part of a storm water drainage system designed for facility compliance with the NPDES storm water program.

There have been several attempts at providing oil water separator systems. Such processes and devices are typically used in parking garages, process plants, maintenance facilities and service stations that process storm water runoff or process water.

For example, Pank, U.S. Pat. No. 5,746,911, discloses an apparatus for separating a light from a heavy fluid, such as occurs as between oil and water from parking lot run-off. The system utilizes two large tanks connected to each other by a pair of conduits. Under most conditions, water flow enters the inlet tank flows into the separation tank, and then finally flows from the separation tank to the outlet conduit. However, when the system is subjected to a heavy rain, the fluid level in the inlet tank rises to a level at which there is a direct overflow into the outlet conduit.

Meanwhile, Keep, U.S. Pat. No. 5,229,015, discloses a liquid separator designed to separate a mixture of immiscible liquids of different densities, such as oil and water, wherein one of the liquids is in a discontinuous phase. A coalescing medium within the container encourages coalescence and agglomeration of the discontinuous phase liquid.

Norman, U.S. Pat. No. 4,844,819, discloses an oil and water separator having plural nested separating tanks. In one embodiment of the invention, plastic corrugated tubing is located in the separating tanks. A method for separating oil from water using the device is also disclosed.

Rice, U.S. Pat. No. 5,520,825, discloses an oil and water separator. A series of tubes in the dividing wall assist the liquid's oil particles pass out of the sludge chamber.

Sager, U.S. Pat. No. 5,505,860, discloses a grease and oil trap for separating and retaining grease, oil, and particulates from water or other fluids. The inlet fitting comprises a uniquely shaped deflecting cup.

Aymong, U.S. Pat. No. 4,722,800, discloses an oil and water separator. A velocity head diffusion baffle is positioned beneath the inlet orifice. Corrugated coalescer plates are positioned atop a sludge baffle.

Williamson, U.S. Pat. No. 6,290,545, discloses a drainwater treatment system. An elbow-shaped conduit provides passage through the barrier between the first and second compartments of the system.

To meet water runoff compliance regulations the stormwater drainage systems must be capable of removing the petroleum hydrocarbons from the natural water runoff at least down to 15 parts per million rpm), which includes the removal of all free oil droplets equal to or greater than 20 microns in size. As a result of regulations, it is apparent the need exists for an oil water separator which can effectively collect sediment as well as assist oil in separating from water.

SUMMARY OF THE INVENTION

In accordance with this invention an oil water separator system diffuser is provided for use in an oil-water separator system enclosure having an inlet end and an outlet end, with the inlet end having an inlet conduit, and the outlet end having an outlet conduit. The diffuser includes an attachment portion and a lower portion, with the attachment portion being secured to the inlet conduit, and with the lower portion being connected to the attachment portion and comprising flow channeling means. The diffuser has a first side and a second side, the first side only having formed therein a plurality of apertures.

Furthermore, the diffuser is of a generally inverted Y-shape. The first side of the diffuser has apertures formed in its lower portion. In the preferred embodiment of the invention, the first side has apertures formed in both the attachment portion and the lower portion. Also in the preferred embodiment, the apertures are configured as slots.

In the preferred embodiment of the invention, the flow channeling means comprise a plurality of flow channeling members. The flow channeling members extend downwardly inside the enclosure in a generally vertical plane. The lower portion of the flow channeling means includes a flow diverter.

There is also disclosed, an inlet delivery system for an oil-water separator system having an enclosure having an inlet end and an outlet end, with the inlet end having an inlet conduit and a first end wall, and with the outlet end having an outlet conduit, and where the inlet delivery system has a diffuser, with the diffuser having an attachment portion and a lower portion, the attachment portion being secured to the inlet conduit, and the lower portion being connected to the attachment portion and comprising flow channeling means, the diffuser having a first side and a second side, and with the first side facing the first end wall and having formed therein a plurality of apertures.

The aforementioned diffuser is of a generally inverted Y-shape. In the preferred embodiment, the first side only of the diffuser has apertures formed therein with the apertures being formed in the lower portion of the diffuser. The apertures preferably are configured as slots. The flow channeling means preferably include a plurality of flow channeling members.

The inlet delivery system also has a baffle with uptake control means, with the baffle having a first side, a second side and a top edge, while in the preferred embodiment, the uptake control means includes a plurality of pipes and a pipe restraining means, with each of the pipes having a first end, a second end and a sidewall, with at least one of the pipes having a sidewall with apertures formed therein. The pipes' first ends are retained by the pipe restraining means adjacent the baffle's first side, and the pipes' second ends being retained adjacent the top edge of the baffle.

In the preferred embodiment, the uptake control means includes a plurality of corrugated pipes. Also, in the preferred embodiment, the baffle has formed therein a plurality of apertures, such that the second ends of the pipes of the uptake control means extend through the baffle apertures consequently extending downstream of the inlet delivery system. One embodiment of the pipe restraining means comprises a strap with both of its ends secured to said baffle. Preferably, the baffle extends transversely completely across said enclosure.

There is also disclosed an inlet delivery system for use in an oil-water separator system enclosure having an inlet end and an outlet end, with the inlet end having an inlet conduit and a first end wall, and with the outlet end having an outlet conduit, with the inlet delivery system including a diffuser and a baffle with uptake control means. The diffuser has an attachment portion and a lower portion, with the attachment portion being secured to the inlet conduit, and with the lower portion being connected to the attachment portion and comprising flow channeling means. The diffuser has a first side and a second side, the first side facing the first end wall and preferably having formed therein a plurality of apertures.

The baffle has a first side, a second side, and a top edge, with the uptake control means in the preferred embodiment of the invention including a plurality of pipes along with a pipe restraining means, each of the pipes having a first end, a second end, and a sidewall, with at least one of the pipes having a sidewall with apertures formed therein, such that the pipes first ends are retained by the pipe restraining means adjacent the baffle first side, and with the pipes second ends retained adjacent the top edge. In the preferred embodiment of the invention, the baffle has formed therein a plurality of apertures, with the second ends of the pipes of the uptake control means extending through the baffle apertures and consequently extending downstream of the inlet delivery system.

The diffuser of this inlet delivery system is of a generally inverted Y-shape. In the preferred embodiment of the invention, the first side only of the diffuser has apertures formed therein. Further, preferably the pipe restraining means is formed having a strap with both of its ends secured to the baffle, with the baffle extending transversely completely across the enclosure, and with the pipes of the uptake control means being corrugated.

The primary objective of this invention is to provide an inlet delivery system for a oil-water separation the utilization of which inlet delivery system efficaciously enhances the performance of the oil-water separator system in which it is used. An important aspect of this objective is the providing of a unique diffuser.

Another objective is to provide an oil-water separator system capable of removing the petroleum hydrocarbons at least down to 15 parts per million (ppm), which includes the removal of all free oil droplets equal to or greater than 20 microns in size. An important aspect of this invention is the providing of a unique diffuser and a baffle having unique uptake control means.

Another objective is to provide an oil-water separation system diffusing chamber that is of relatively economical construction and is relatively easy to fabricate.

Other objects and advantages of the invention will be apparent from the following description, the accompanying drawings, and the appended claims.

DETAILED DESCRIPTION OF THE DRAWINGS

Figure 1:
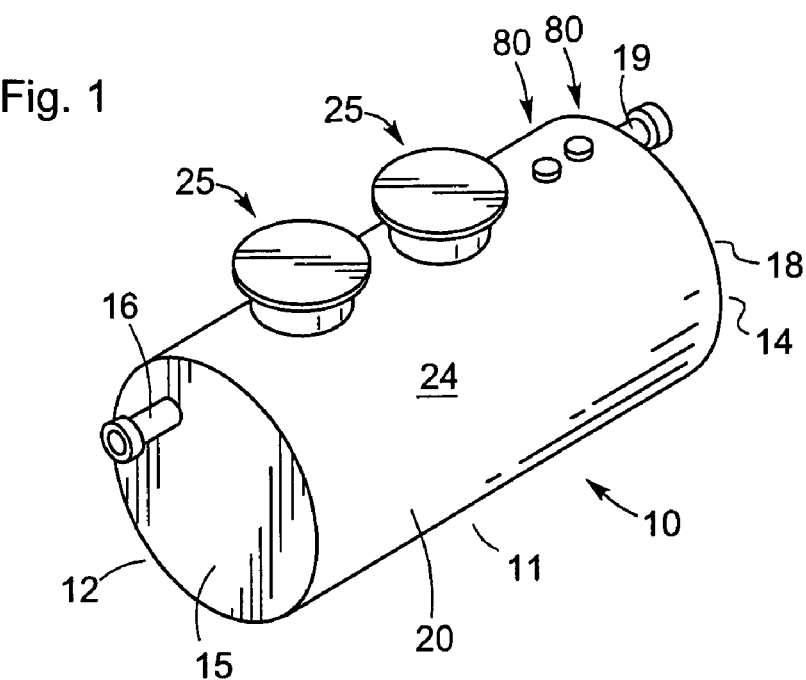
FIG. 1 is a perspective view of an oil-water separation system made in accordance with the present invention.

Having reference to the drawings, attention is directed first to FIG. 1 which discloses an oil-water separation system designated generally by the numeral 10, made in accordance with the present invention. The separator system includes as one of its major components an enclosure such as a tank 11, with an inlet end 12 and an outlet end 14. The tank is generally elongated, although the actual shape could be cylindrical, rectangular, spherical, or oblate. The tank could be constructed from metallic or synthetic material, including but not limited to such synthetic materials as plastic and fiberglass.

The tank also includes an enclosure side wall 20 having an inner surface 22 and an outer surface 24. To assist with the cleaning of the interior of the enclosure 11, the embodiment of the invention shown in the drawings features access risers 25, with a comparison of FIGS. 1 and 2 disclosing a first access riser 26 and a second access riser 27. Each access riser 25 comprises a cover 30 and a riser sidewall 31.

The inlet end 12 has a first end wall 15 through which an inlet conduit 16 shown as being a pipe passes. Similarly, the outlet end 14 has a second end wall 18 through which an outlet conduit 19 shown as being a pipe passes. The inlet pipe could be constructed from either metallic or synthetic material, or a combination thereof. The inlet pipe 16 enters the tank 11 through what is known in the trade as the head of the tank (the end of the tank which has been designated the inlet end) preferably near the top centerline of the tank, although some tanks have the inlet pipe enter the enclosure through the top of the tank.

After the inlet conduit 16 enters the tank 11, it can be appreciated that in the embodiment shown it is directed in a vertical downward direction using a short-radius bend of the type well-known in the art. Of course, if the inlet pipe enters the tank through the top of the enclosure, then the inlet pipe is already pointed in a vertical downward direction. In the embodiment shown, after the bend there is a short length of pipe which terminates with either a flange, a female end camlock fitting, or other similar means preferably to facilitate a removable connection to the pipe. Otherwise, the pipe terminates with one of the aforesaid connecting means. The terminus of the inlet pipe is in the diffusing chamber 33, also referred to as the settling/sludge chamber.

Figure 2:
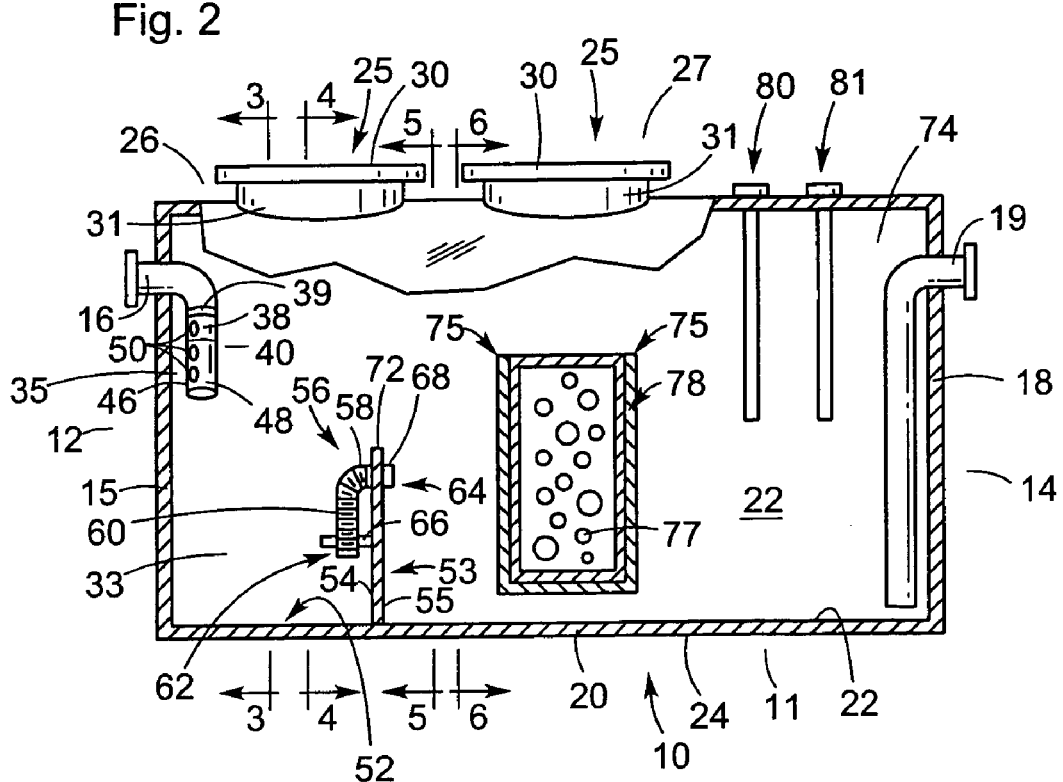
FIG. 2 is an exploded side elevational view.
Figure 3:
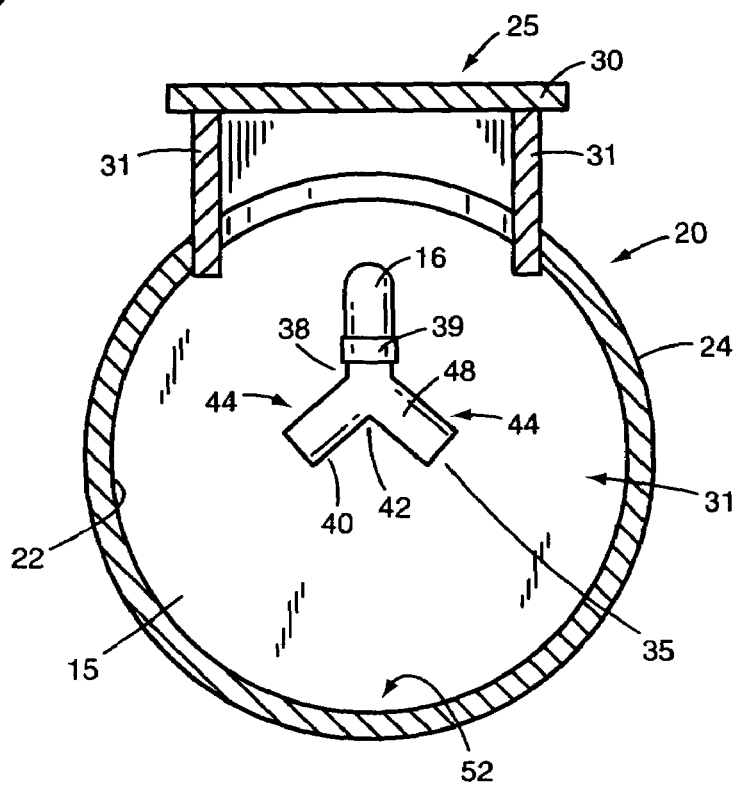
FIG. 3 is a vertical sectional view on an enlarged scale taken along line 3—3 of FIG. 2.
Figure 5:
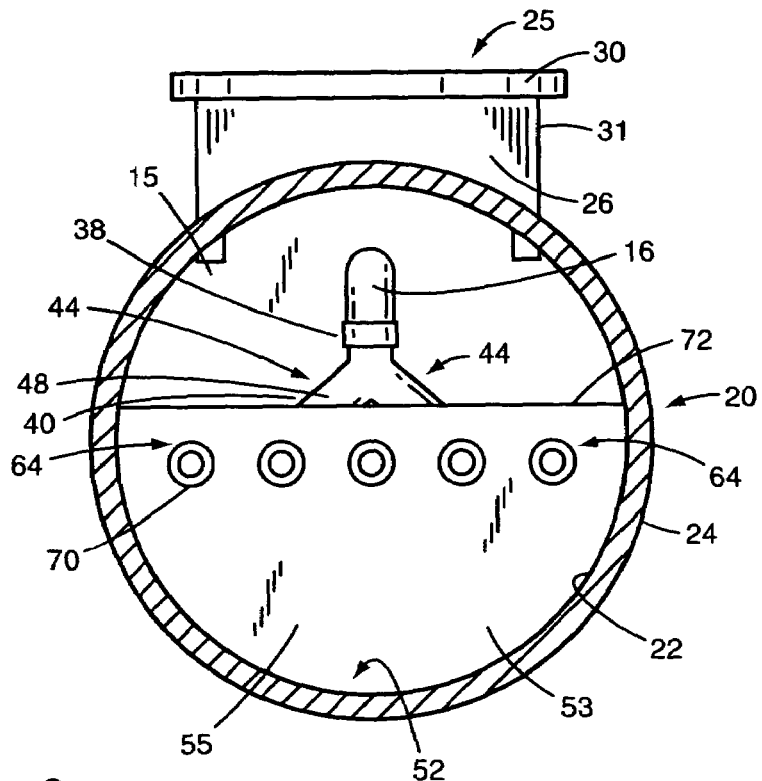
FIG. 5 is a vertical sectional view on an enlarged scale taken along line 5—5 of FIG. 2.

A comparison between FIGS. 2, 3, and 5 disclose a diffuser member 35 having an attachment portion 38 attached to the inlet pipe by attachment means 39 such as a mating flange, a male end camlock fitting or other similar means which completes the connection of the diffuser member 35 to the inlet pipe 16. This could even include the welding of the diffuser member to the inlet pipe. The diffuser member 35 also includes a lower portion 40 or flow channeling means. Once again, a comparison of FIGS. 2, 3, and 5 discloses that the flow channeling means 40 in the preferred embodiment of the invention includes a flow diverter 42 which diverts the flow into the flow channeling members 44. The diffuser 35 has a first side 46 and a second side, with apertures 50 being formed in the first side 46.

In fact, it will be appreciated that in the preferred embodiment of the invention, the apertures take the form of slots and occur only on the first side of the diverter, that being the side of the diverter which faces the first end wall 15. The division of the flow at the flow diverter reduces the velocity in each flow channeling member 44, as well as providing direction to the flow into the settling/sludge or diffusing chamber 33. In the preferred embodiment of the invention, the diffuser has an inverted Y-shape, with a neck and two legs. The apertures in the diffuser are at least in the legs of the diffuser, although preferably they also occur in the neck portion.

The presence and orientation of the diffuser apertures further allows the diversion of the flow from a single vertical direction. Although the diffuser is oriented in a generally vertical plane, the presence of the diverter coupled with the distribution of the apertures throughout the first face of the diffuser causes much of the flow to be directed either towards the first end wall or at least in a direction towards the bottom 52 in a direction other than vertically downward. Also, the diffuser apertures serve as an aide in permitting unvented gases to escape the flow thereby assisting in the reduction of turbulence created by the gases as the inlet flow enters the settling/sludge chamber. Still further, it assists in reducing flow velocity. By minimizing the amount of turbulence and velocity of flow which enters the diffusing chamber in a vertical direction, the separation of sediment towards the bottom 52 which occurs in this compartment is made more efficient. It is believed that the reduction of velocity of the flow entering the settling/sludge chamber is important because it provides more time for the flow to spend in that initial chamber so that consequently there is more time for the sediment in the flow to separate. It is believed that the reduction of turbulence of the flow entering the settling/sludge chamber is important because it allows the settling to continue and stabilize.

Figure 4:
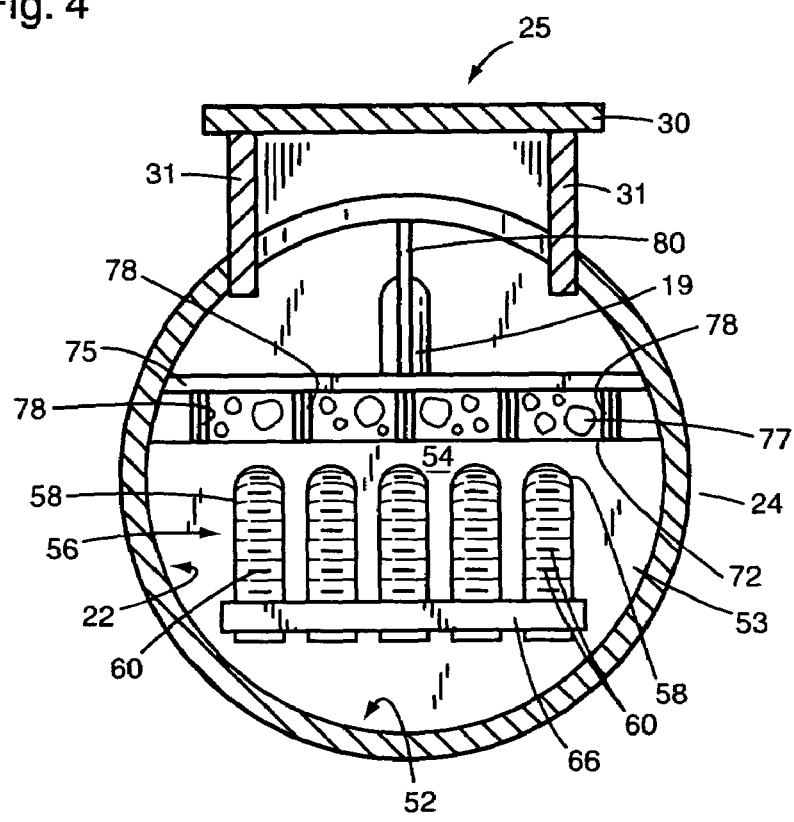
FIG. 4 is a vertical sectional view on an enlarged scale taken along line 4—4 of FIG. 2.

As can be appreciated from a comparison of FIGS. 2, 4, and 5, the inlet delivery system of this invention also comprises a baffle 53 which is shown as being a panel which extends upwardly from the bottom 52 of the tank 11. Preferably, the baffle extends transversely completely across the enclosure as shown in the drawings. The baffle has a first side 54, a second side 55, and a top edge 72. The uptake control means 56 includes a plurality of pipes 58, preferably corrugated. The pipes are preferably made of synthetic material. The number and diameter of the pipes is somewhat dependent on the size of the tank and amount of expected flow. Furthermore, at least one and preferably all of the pipes have perforations 60 therein, with these perforations preferably being cut circumferentially around the pipe. In the preferred embodiment of the invention, there are several of these perforations in the form of slots which are located in every other corrugation.

Each of the pipes 58 of the uptake control means 56 have a first end 62 and a second end 64. The first ends 62 are positioned a relatively short distance above the bottom 52 of the settling/sludge chamber 33 and retained adjacent the first side 54 of the baffle 53 by pipe restraining means 66. This pipe restraining means 66 could be a strap, rod or bar, or some other type of holding device such as a clamp, ring clamp, or a clasp, any of which could be directly secured to the inner surface 22 of the tank, but which more preferably are secured to the first side 54 of baffle 53 near sidewall 20.

With respect to the second ends 64 of the pipes 58, they are attached to the upper portion of the baffle 53 by a second end securing means 68. Each pipe can be attached to the baffle either by inserting the second end 64 of the pipe directly through the apertures 70 in the baffle as shown in the drawings (where the number of apertures are shown as corresponding to the number of pipes), or by use of a mechanical connection such as a ring clamp. If the second ends of the pipes are made to extend through the baffle apertures, it will be appreciated that they extend downstream of the inlet delivery system as can best be seen in FIG. 2. For example, if one or two corrugations are made to project and extend through an aperture, that respective end of the pipe, due to its weight and dimensioning, is attached to the baffle. Regardless of the specific means of securing, the location where the second end is secured is close to the top edge 72 of the baffle. In actual assembly, the second end of the pipe is secured in place. Then the pipe is bent downward approximately 90° at which time it is held in place by the pipe restraining means 66.

When the pipes 58 of the uptake control means 56 are in place, their bottom edges are trimmed to make sure they remain high enough above the bottom 52 to stay clear of any accumulation of sludge in the diffusing chamber 33. If the pipes come into contact with the sludge at the bottom of the tank, flow would be inhibited thus decreasing the effectiveness of the pipes in helping to convey the flow past the diffusing chamber. The length of the pipes is determined by the length of the outermost pipes, especially in cases where the tank has a rounded cross-section.

It has been discovered that the combination of the unique diffuser structure of this invention and the uptake control means especially with corrugated, perforated pipes causes a significant amount of oil to be removed from the water prior to the water's ultimate exit from the tank via the outlet conduit. Put another way, the invention significantly reduces the amount of pollutants remaining in the water after passage through an oil-water separator system incorporating the inlet delivery system of the invention.

Figure 6:
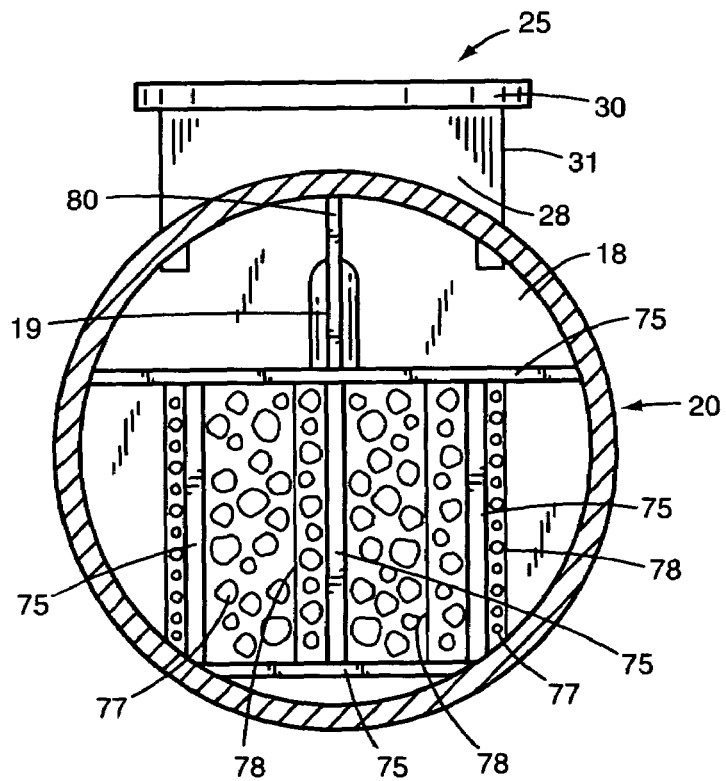
FIG. 6 is a vertical sectional view on an enlarged scale taken along line 6—6 of FIG. 2.

Once the flow passes up through the pipes of the uptake control means, it enters the oil-water separator main chamber 74 as can best be seen in FIG. 2. Once there, the flow encounters frame member 75, the purpose of which is to assist in the use of coalescing medium 77 which is held in a suitable coalescing medium container 78, whether that be in the form of a bag or a more rigid case. The coalescing medium serves to cause agglomeration of the oil particles, which subsequently float to the top of the tank for removal via the access risers 25. The frame member 75 is shown in comparing FIGS. 4 and 6 as having a pair of horizontally oriented rods and a base all of which extend transversely across the tank, with the rods being at a height above that of the baffle. The frame also comprises a plurality of upright members which extend upwardly from the frame base to the two rods, the purpose of these upright members being to provide assistance in retaining the coalescing medium container 78 in the frame.

As a result of the characteristics of the structure of the invention, an oil-water separation system is provided which can efficaciously separate oil (specific gravity equal to or less than 0.95) from water. The oil-water separation systems utilizing the invention can range in size from 100 gallons to 50,000 gallons. The water to be processed enters the inlet delivery system via the inlet pipe. Once inside the tank or enclosure of the oil-water separation system, the water flows through the diffuser and exits generally downwardly as well as towards the first end of the enclosure. The water then rises through the pipes of the uptake control means which conveys most, if not all, of the inlet flow from the settling/sludge chamber to the oil-water separator main chamber with its monitor 80 of the type known in the tank art as an oil level sensor, which oil-water separator main chamber has located therein coalescing medium, such that when the water exits the enclosure via the outlet conduit, the oil has efficaciously been separated from the water. An oil pump out port 81 is provided for removal of the oil from atop the water, or alternatively an access riser can facilitate such removal.

While the form of apparatus and method herein described constitutes a preferred embodiment of this invention, it is to be understood that the invention is not limited to this precise form of apparatus or method and that changes may be made therein without departing from the scope of the invention which is defined in the appended claims.

What is claimed is:

1. An oil-water separator system diffuser for use in an oil-water separator system enclosure having an inlet end and an outlet end, said inlet end having an inlet conduit, said outlet end having an outlet conduit, said diffuser comprising an attachment portion in the form of a single neck, and a lower portion comprising a plurality of legs extending downwardly from said neck, said diffuser being of a generally inverted Y-shape, said attachment portion being secured to said inlet conduit, said lower portion being connected to said attachment portion and comprising flow channeling means, said diffuser having a first side and a second side, said first side only having formed therein a plurality of apertures, said first side having apertures formed in both said neck and said legs.

2. The oil-water separator system diffuser according to claim 1 wherein said apertures are configured as slots.

3. The oil-water separator system diffuser according to claim 1 wherein said flow channeling members extend downwardly inside said enclosure in a generally vertical plane.

4. The oil-water separator system diffuser according to claim 1 wherein said lower portion includes a flow diverter.

5. An inlet delivery system for an oil-water separator system having an enclosure having an inlet end and an outlet end, said inlet end having an inlet conduit and a first end wall, said outlet end having an outlet conduit, said inlet delivery system comprising a diffuser, said diffuser comprising an attachment portion and a lower portion, said attachment portion being secured to said inlet conduit, said lower portion being connected to said attachment portion and comprising flow channeling means, said diffuser having a first side and a second side, said first side facing said first end wall and having formed therein a plurality of apertures, and said inlet delivery system having a baffle with uptake control means, said enclosure having a bottom from which said baffle extends upwardly therefrom, said baffle located intermediate said diffuser and said outlet end, said baffle having a first side, a second side and a top edge, said uptake control means comprising a plurality of pipes and a pipe restraining means, each of said pipes having a first end, a second end and a sidewall, said first ends of said pipes being retained by said pipe restraining means adjacent said baffle first side, said second ends of said pipes being retained adjacent said top edge.

6. The inlet delivery system according to claim 5 wherein said diffuser is of a generally inverted Y-shape.

7. The inlet delivery system according to claim 5 wherein said diffuser first side only has apertures formed therein, said apertures being formed in said lower portion of said diffuser.

8. The inlet delivery system according to claim 5 wherein said diffuser apertures are configured as slots.

9. The inlet delivery system according to claim 5 wherein said flow channeling means comprise a plurality of flow channeling members.

10. The inlet delivery system according to claim 5 wherein said uptake control means comprises a plurality of corrugated pipes.

11. The inlet delivery system according to claim 5 wherein said baffle has formed therein a plurality of apertures, said second ends of said pipes of said uptake control means extending through said baffle apertures so as to extend downstream of said inlet delivery system.

12. The inlet delivery system according to claim 5 wherein said pipe restraining means comprise a strap with both of its ends secured to said baffle.

13. The inlet delivery system according to claim 5 wherein said baffle extends transversely completely across said enclosure.

14. The inlet delivery system according to claim 5 wherein at least one of said pipes of said uptake control means has a sidewall with apertures formed therein.

15. An inlet delivery system for use in an oil-water separator system enclosure having an inlet end an outlet end, and a bottom, with the inlet end having an inlet conduit and with the outlet end having an outlet conduit, said inlet delivery system comprising
 a diffuser, said diffuser comprising an attachment portion and a lower portion, said attachment portion being secured to said inlet conduit, said lower portion being connected to said attachment portion and comprising flow channeling means, said diffuser having a first side and a second side, said first side having formed therein a plurality of apertures, and
 a baffle with uptake control means, said baffle extending upwardly from the bottom of the enclosure, said baffle located intermediate said diffuser and said outlet end, said baffle having a first side, a second side and a top edge, said uptake control means having a first end, a second end and a sidewall, said second ends of said uptake control means being retained adjacent said top edge, said baffle having formed therein a plurality of apertures, said uptake control means extending through said baffle apertures so as to extend downstream of said inlet delivery system.

16. The inlet delivery system according to claim 15 wherein said diffuser is of a generally inverted Y-shape, said first side only of said diffuser having apertures formed therein, said uptake control means comprising a plurality of pipes and a pipe restraining means, said pipe restraining means comprising a strap with both of its ends secured to said baffle, said baffle extending transversely completely across said enclosure, said pipes of said uptake control means being corrugated.

* * * * *